April 11, 1961    J. E. ESHBAUGH ET AL    2,979,172
THROTTLE CONTROL MECHANISM
Filed Sept. 24, 1958    2 Sheets-Sheet 1

INVENTORS
Jesse E. Eshbaugh &
BY John C. McDougal

D.D. McGraw
ATTORNEY

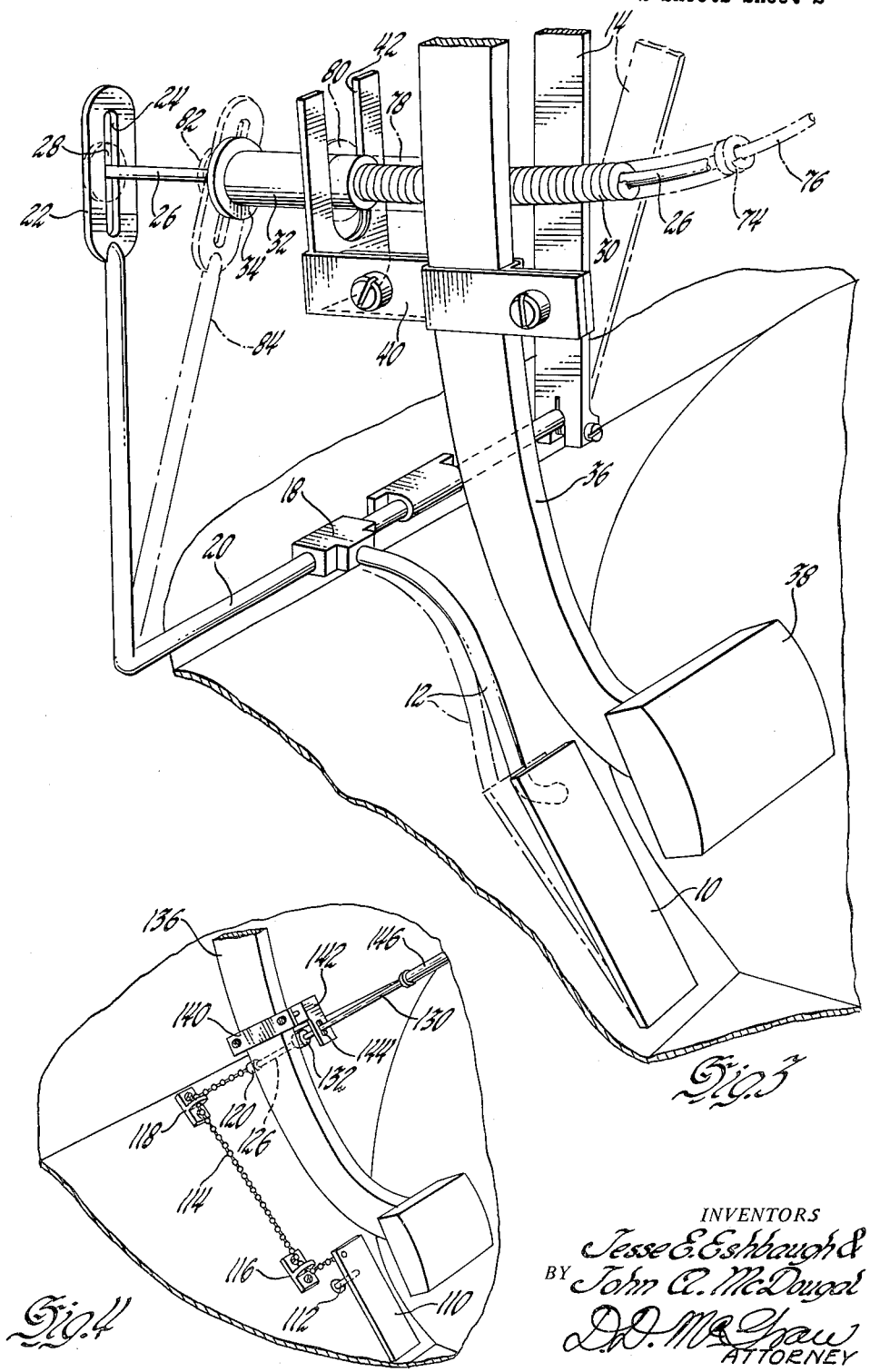

United States Patent Office 2,979,172
Patented Apr. 11, 1961

2,979,172

THROTTLE CONTROL MECHANISM

Jesse E. Eshbaugh and John A. McDougal, Flint, Mich., assignors to General Motors Corporation, Detroit, Mich., a corporation of Delaware Filed Sept. 24, 1958, Ser. No. 763,005

4 Claims. (Cl. 192—3)

The invention relates to a control mechanism for a throttle and more particularly to a control which will limit the minimum throttle setting of an automotive vehicle engine. The control may be engaged by the vehicle operator when desired. It may be set to any desired minimum throttle setting and will retain this setting when the mechanism is operative to limit the throttle position. It will also retain this setting during the inoperative period of the mechanism. This is referred to as a memory feature. The mechanism is entirely mechanical in operation and does not depend upon an outside source of energy such as fluid pressure or the vehicle electrical system for its operation.

The preferred form of the invention provides a mechanism by which the vehicle accelerator pedal may be operated without interference when the mechanism is disengaged or inoperative. When the mechanism is engaged, it will prevent the accelerator pedal, and the throttle linkage and the engine throttle valve from returning to zero throttle position when the vehicle operator's foot is removed from the accelerator pedal. It will thus maintain a constant throttle setting. The mechanism is manually engaged by simple operation of a control unit which may be mounted in any convenient position such as a portion of the instrument panel which is adjacent the operator. The unit may be disengaged by use of the same control unit and will also be disengaged at any time when the vehicle operator presses the brake pedal to slow the vehicle or bring it to a stop. The unit will not reengage until the operator again sets the control unit to the operative position. This is advantageous since it prevents the mechanism from accidental reengagement without conscious knowledge of the operator.

In the drawings:

Figure 3 is an isometric view of a portion of the mechanism of Figure 1 with that portion enlarged and having parts broken away and in section.

Figure 4 is a view similar to Figure 3 and illustrates a modification of the mechanism of Figure 1.

Figure 1:
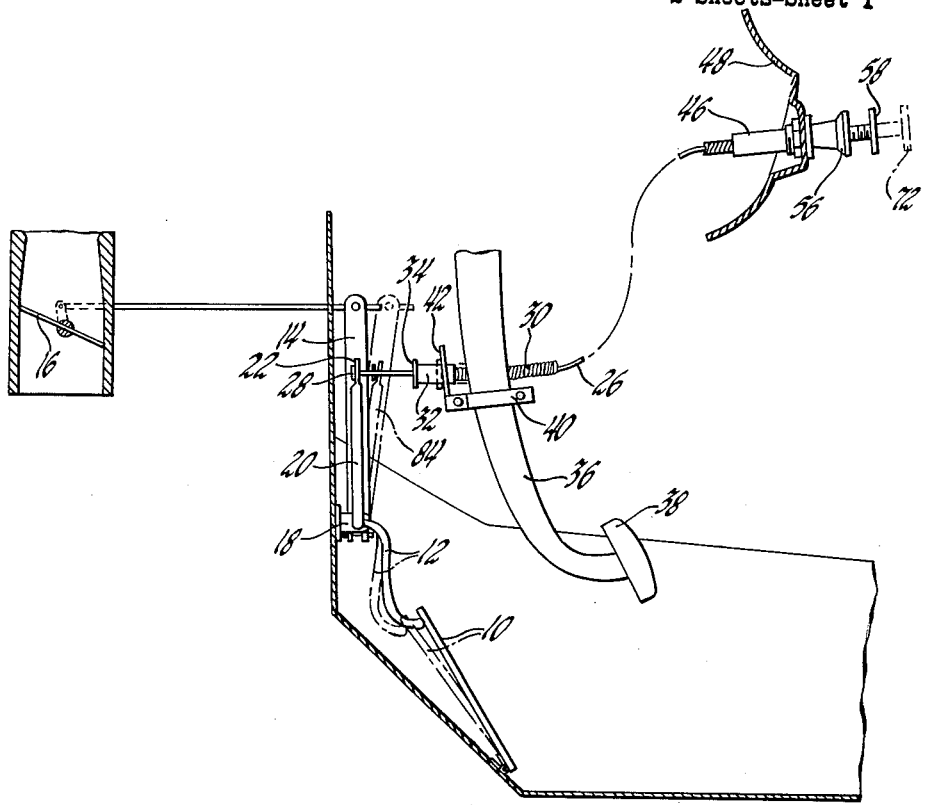
Figure 1 is a schematic view of a mechanism embodying the invention and having parts broken away and in section.

The assembly illustrated in Figure 1 includes the accelerator pedal 10 which actuates the accelerator rod 12 so that the rod is pivoted in a generally vertical plane about a horizontal axis. A throttle control link 14 is also pivoted about that axis by movement of the accelerator pedal and is connected through appropriate linkage to the engine throttle 16. A bracket 18 is attached to rod 12 and provides the connection for securing arm 20 for movement of that arm by the accelerator pedal. Arm 20 is thus caused to pivot about the horizontal axis in a manner similar to that of link 14. The free end of arm 20 may be provided with a flat section 22 through which an elongated slot 24 is formed.

The control unit includes a Bowden wire which provides an inner control wire 26, having a button or stop 28 on the end positioned adjacent arm 20, and an outer control wire 30. The end of wire 30 adjacent the throttle linkage has a bushing 32 secured thereto. This bushing is spaced from button 28 and the inner control wire 26 extends through and beyond the bushing to provide the spaced relation. The bushing 32 is provided with an enlarged head 34 on the end of the bushing adjacent button 28.

Arm 20 extends upwardly in a plane substantially parallel to and adjacent the plane in which the brake actuating lever 36 is pivoted when the vehicle operator actuates the vehicle brakes by pressing brake pedal 38. Brake actuating lever 36 is provided with a bracket 40 having a U-shaped extension 42 extending upwardly therefrom through which bushing 32 is slidably received. The bushing head 34 is on the side of extension 42 which is adjacent the arm 20.

Control wires 26 and 30 lead to a control unit which may be mounted on the instrument panel of the vehicle. Inner wire 26 passes through a cylindrical sleeve 44 of the control unit. Sleeve 44 is mounted for reciprocation within the control unit housing 46. This housing may be secured to the instrument panel 48 by any suitable means such as nut 50. One end of sleeve 44 is provided with an enlarged section or land 52 which engages the control housing 46 in a manner similar to the lands formed on a spool valve. A slot and spline guide may be provided within control housing 46 which cooperates with a similar construction on the land 52 of sleeve 44 to prevent rotation of the sleeve. Any suitable construction to prevent sleeve rotation may be used. A compression spring 54 is received within housing 46 and abuts one end of the housing and the inner side of the sleeve land 52. This spring urges sleeve 44 to the left as illustrated in the drawings. The outer end of sleeve 44 may be formed integrally with or connected to a re-set control knob 56. A unit adjusting knob 58 is also provided adjacent knob 56. The shank 60 of knob 58 is provided with external threads which engage the internal threads 62 formed in the body of knob 56. By this arrangement knobs 56 and 58 may be moved axially together by pushing or pulling either of the knobs, and knob 58 may be adjusted axially relative to knob 56 by threading the shank 60 into or out of that knob. The inner control wire 26 is secured to the inner portion of shank 60 by suitable means such as interengaging threads. Thus the axial movement of knob 58 will be transmitted to the inner control wire 26. The outer control wire 30 is secured to sleeve 44 so that this control wire moves axially with the sleeve.

Figure 2:
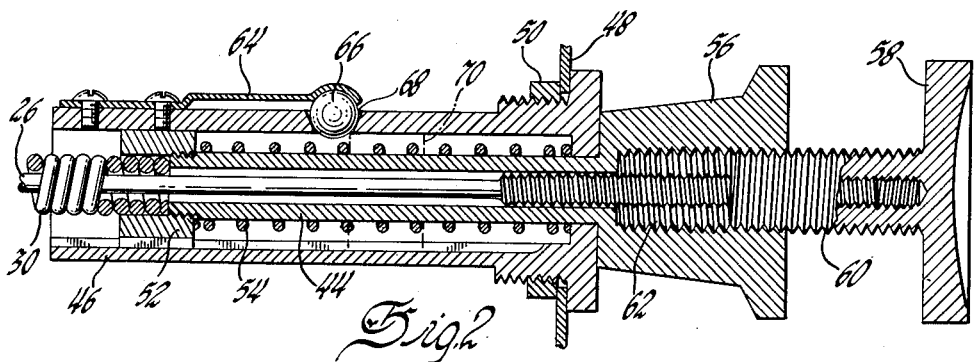
Figure 2 is a cross section view of the instrument panel control unit portion of the mechanism illustrated in Figure 1.

The control unit housing 46 is provided with a detent spring 64 and a detent ball 66 which extends through an aperture 68 of the housing so that it will engage sleeve land 52 when the sleeve is moved to the right against the force of spring 54 to the position 70 which is illustrated in dash lines in Figure 2. This position is also illustrated by the dash lines forming the outline 72 of adjusting knob 58 as illustrated in Figure 1. When sleeve 44 is moved to and retained in this position, outer control wire 30 is moved to the position 74 illustrated in dot and dash lines in Figure 3 and inner control wire 26 is moved to the position 76. Bushing 32 is moved to the position 78 so that the bushing head 34 is positioned behind and immediately adjacent the bracket extension 42 as illustrated at 80. Since inner control wire 26 has been moved, button 28 will assume position 82 and the control arm 20 will be pivoted to position 84. This position will correspond to a part throttle setting which has been determined by the location of adjusting knob 58 relative to the re-set control knob 56. Arm 20 will rest against button 28 when the vehicle operator is not pressing the accelerator pedal 10, thereby preventing the accelerator pedal and the throttle linkage from returning to zero throttle. The position of the throttle 16 may be advanced at any time toward full throttle since control wire 26 will ride freely within the slot 24 of arm 20 as that arm moves toward the full throttle position. The mechanism will therefore provide no interference for throttle advancement beyond the pre-set point and will retain the desired minimum throttle setting when the accelerator pedal is released.

The control knobs 56 and 58 are illustrated in solid lines in the inoperative position and in dash and dot lines when in the throttle controlling position. When the control unit is in the inoperative position, sleeve land 52 is positioned to the left as shown in Figure 2 and is held in that position by spring 54. Knobs 56 and 58 are also positioned to the left as shown in the drawings. The head 34 of bushing 32 and button 28 on the end of control wire 26 are positioned toward the zero throttle position of clamp extension 42 and arm 20 so that bushing head 32 and button 28 provide no interference with the operation of the brake or accelerator pedal. When the re-set control knob 56 is pulled outwardly toward the engaging position and land 52 is engaged and held by detent ball 66, the force of spring 54 is insufficient to overcome detent ball 66. Knob 58 may be screwed into or out of knob 56 to move inner control wire 26 relative to outer control wire 30. This adjustment changes the minimum throttle position by moving wire 26 and button 28 relative to arm 20. It may have sufficient range to provide any adjustment from zero throttle to full throttle conditions. Thus, as knob 58 is screwed out of knob 56, the minimum throttle position approaches the full throttle setting.

When the control mechanism is in the operative position, the minimum throttle setting is maintained. Should the vehicle operator apply the brakes, bracket extension 42 engages bushing head 34 and a force is exerted against bushing 32 which is transmitted by outer control wire 30 to sleeve 44. This force causes the sleeve land 52 to override the detent 66. The control unit is then released and spring 54 moves it to the inoperative position. In the inoperative position button 28 will not interfere with the throttle linkage even through adjusting knob 58 may be set at full throttle relative to control knob 56.

The modification illustrated in Figure 4 provides similar results and is operated in the same manner. In this instance, however, the arm 20 is replaced by a flexible link. The accelerator pedal 110 operates the accelerator rod 112. The flexible throttle control link 114 is attached to one end to pedal 110. Brackets 116 and 118 may be provided to fairlead the link 114 to the stop 120. This stop is positioned on the end of inner control wire 126 in a manner similar to that of button 28 of the mechanism illustrated in Figures 1 and 3. In this instance stop 120 merely provides a connection between link 114 and wire 126. The outer control wire 130 has a bushing 132 secured to its extreme end which is engageable by a bracket 140 mounted on the brake lever 136. The portion of bracket 140 which is engageable with bushing 132 includes an extension 142 in which an elongated slot 144 is provided. Inner and outer control wires 126 and 130 extend through slot 144 and are connected to the control housing 146. The device is operated in the same manner as the device first described. When the mechanism is in the operative position, stop 120 is moved upwardly and to the right as illustrated in Figure 4 so that flexible link 114 is taut, thereby limiting accelerator pedal 110 to a minimum throttle setting. Since flexible link 114 is preferably made of a ball chain or a flexible cable, accelerator pedal 110 may be moved beyond the minimum setting without disturbing the remainder of the control. When the vehicle operator's foot is removed from the pedal, the position of inner control wire 126 will determine the minimum throttle setting obtained. When the operator actuates the vehicle brakes, extension 142 engages bushing 132 and moves the control unit to the inoperative position as before.

A control mechanism for a vehicle throttle has thus been provided which is simple in operation and lends itself to inexpensive manufacture and installation. It may be engaged only by conscious action of the vehicle operator and may be disengaged by actuation of the vehicle brake system. If the same throttle setting is desired upon reengagement, the operator need only reset the control unit to the operative position and the same throttle setting which was last in effect will again be obtained. The operator may preset the desired minimum throttle setting or he may change the setting at any time.

What is claimed is:

1. In a throttle control mechanism for an automotive vehicle engine having a throttle valve and linkage including an accelerator pedal connected therewith and controlling said valve, adjustable stop means engageable with a portion of said throttle linkage to prevent return of said throttle valve to the zero throttle position and movable to a non-engageable zero throttle position, a control unit for said stop means including a first linearly movable member having said stop means attached thereto for movement therewith and a second linearly movable member normally movable with said first movable member and means for linearly adjusting said first movable member relative to said second movable member and detent means operatively engaging said first and second movable members to hold said members and said stop means in a first position to prevent said throttle valve from returning to zero throttle, and means for overcoming said detent means to permit movement of said first and second movable members and said stop means to the non-engageable position whereby said throttle may be returned to the zero throttle position.

2. The control mechanism of claim 1, said means for overcoming said detent means including an element movable with actuation of the vehicle brake and engaging said second movable member to override said detent, and spring means urging said first and second movable members and said stop means to the non-engageable position.

3. In combination with a vehicle throttle control mechanism for an internal combustion engine having a throttle controlled by an accelerator pedal and linkage connecting said pedal and said throttle, a first control member and pedal limiting means connecting said first control member and said pedal, a second control member and brake actuating means having a bracket secured thereto and receiving said second control member therethrough, control means connected with said first and second control members and adapted for moving said members independently and concurrently and including detent locking means for said members, stop means on said second control member and engageable by said bracket upon application of the vehicle brakes through movement of said brake actuating means to overcome said detent locking means and render said control mechanism inoperative.

4. An automotive vehicle engine throttle valve limiting mechanism comprising linkage for controlling said valve and linkage movement limiting means engageable with said valve controlling linkage for limiting movement thereof in one direction and a control unit for said limiting means and vehicle brake actuating means having a slotted bracket operatively engageable with said control unit to render said limiting means inoperative upon actuation of the vehicle brakes, said control unit being adapted to set a predetermined desired throttle position, said limiting means including stop means and a supporting member for said stop means connected with said control unit, said stop means being movable by said control unit and a lost motion connection connecting said stop means and said throttle valve linkage, said lost motion connection comprising a slotted link receiving said stop means supporting member therethrough and mounted on said valve controlling linkage and engageable by said stop means to permit movement of said slotted link about said stop means supporting member in one direction and to prevent movement of said slotted link beyond a preset point in the other direction, said slotted bracket receiving said stop means supporting member therethrough and engageable therewith when the vehicle brakes are actuated.

References Cited in the file of this patent

UNITED STATES PATENTS

| | | |
|---|---|---|
| 2,034,253 | Shelley | Mar. 17, 1936 |
| 2,313,000 | Hauguel | Mar. 2, 1943 |
| 2,447,865 | Du Charme | Aug. 2, 1949 |
| 2,853,164 | Sturdy | Sept. 23, 1958 |
| 2,854,106 | Root | Sept. 30, 1958 |

FOREIGN PATENTS

| | | |
|---|---|---|
| 822,257 | Germany | Nov. 22, 1951 |
| 942,698 | Germany | May 3, 1956 |
| 529,679 | France | Sept. 15, 1921 |